Patented Feb. 19, 1946

2,395,190

UNITED STATES PATENT OFFICE 2,395,190

PROCESS FOR REFINING CRUDE OLEORESIN

Ray V. Lawrence, New Orleans, La., assignor to the United States of America as represented by the Secretary of Agriculture No Drawing. Application December 5, 1944, Serial No. 566,778

7 Claims. (Cl. 260—109)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This is a continuation in part of my copending application for patent Serial No. 412,004, filed September 23, 1941.

This invention relates to the refining of crude pine oleoresin, and the general object is to improve the grade of rosin which may be made from pine oleoresin.

Crude oleoresin is usually contaminated to some extent by dissolved iron compounds. Upon the distillation of the oleoresin, the iron compounds remain in the rosin. The presence of relatively small amounts of iron greatly increase the color of the rosin produced, resulting in a much lower grade product. The presence of iron in rosin is also known to increase the rate at which the rosin combines with oxygen on exposure to the air.

The use of oxalic acid for the improvement of the color of rosin and oleoresin which are contaminated by iron has been known and practiced by the trade for some time. However, when oleoresin that is badly contaminated with iron is treated with oxalic acid, the rosin produced is frequently quite cloudy and in some cases opaque. The material causing the cloudiness is very finely divided and difficult to remove. I have found that this material is insoluble in water and in aqueous oxalic acid solutions, but that a clear rosin of improved grade can be produced from iron contaminated oleoresin by treating it with an aqueous solution containing both oxalic acid and an inorganic acid. I have also found that similar results may be obtained by treating iron contaminated oleoresin with oxalic acid and following this by a treatment with an aqueous solution of an inorganic acid due to the fact that the water-insoluble material formed by the oxalic acid is, as I have found, soluble in aqueous solutions of inorganic acids.

The coloring matter present in oleoresin is usually of two different types, i. e., that caused by iron contamination and that caused by oxidation products. Since the treatment of oleoresin with oxalic acid and inorganic acid mixtures will have very little effect on the coloring matter derived from oxidation products, the color of the final product after such a treatment will depend to a great extent on the amount of oxidation products in the original oleoresin. Thus, a badly oxidized oleoresin may show an improvement of only one or two grades while another oleoresin in which most of the color is caused by iron contamination may show an improvement of seven or eight grades.

My invention may be carried out in a number of ways. The crude oleoresin may be treated with an aqueous acid solution whose density has been increased by the addition of sodium chloride or sodium sulfate to such an extent that the aqueous layer will separate from the oleoresin. However, I prefer to dissolve the crude oleoresin in a water immiscible organic solvent and separate the water and foreign material from the oleoresin solution. The solvent used should be inactive towards the oleoresin constituents and the acid-treating solutions. I have found turpentine, benzene, and gasoline to be suitable solvents. However, I prefer to use gum turpentine since this does not involve the problem of separating the turpentine present in the oleoresin from the solvent used for dilution. The amount of solvent used may vary widely. I have found a solution which yields 40 to 60% rosin on distillation to be convenient for carrying out this process.

The concentration of oxalic acid used is not critical. Satisfactory results have been obtained using aqueous solutions varying in concentration from 1% to a saturated solution. The crystalline dihydrate of oxalic acid may also be added directly to the oleoresin. The use of such crystals in the amount of 0.1 to 3% by weight of the oleoresin to be treated is satisfactory. A molar solution (approximately 9%) was found to be a convenient concentration for the oxalic acid solution. If the concentration of the inorganic acid used is too great, considerable isomerization of the constituents of the oleoresin may take place. Concentrations of the inorganic acids used, varying from 1 normal to 2 normal, were found to be satisfactory.

The optimum temperature for carrying out this process will vary somewhat depending on the nature and amount of solvent used for dissolving the oleoresin. An oleoresin solution prepared by dissolving 100 parts, by weight, of oleoresin in 40 parts, by weight, of gum turpentine gave satisfactory results when treated according to this process at temperatures between 60° and 85° C. A solution prepared using 100 parts, by weight, of oleoresin in 100 parts of petroleum ether (B. P. 30°-60° C.) gave satisfactory results when treated according to this process at room temperature (25°–30° C.).

The following examples illustrate, but do not limit, my invention:

EXAMPLES 1 TO 7

A solution of oleoresin in turpentine was filtered to remove trash and other extraneous matter. A sample of the solution on distillation showed a composition by weight of 42% turpentine and 58% rosin, with a color grade of D. Samples of this solution, 350 grams each, were washed by thoroughly mixing with various aqueous acid solutions. This washing was carried out at temperatures varying from 65° to 80° C. After aqueous solutions had been thoroughly mixed with the oleoresin solution, the aqueous solution was allowed to separate by gravity from the oleoresin solution, and the oleoresin solution washed with distilled water. The grades and appearance of the rosin samples obtained by the steam distillation of these samples are given in Table I.

*Table I*

| No. | Washing solution | Rosin grade | Appearance of rosin |
|---|---|---|---|
| 1 | 100 ml. distilled water | D | Clear. |
| 2 | 100 ml. 9% aqueous oxalic acid | N | Very cloudy. |
| 3 | 100 ml. 5% aqueous sulfuric acid | M | Clear. |
| 4 | 90 ml. 5% aqueous sulfuric acid and 10 ml. 9% aqueous oxalic acid. | N | Do. |
| 5 | 90 ml. 5% aqueous oxalic acid and 10 ml. 5% aqueous sulfuric acid. | N | Do. |
| 6 | 90 ml. 9% aqueous oxalic acid and 10 ml. 5% aqueous hydrochloric acid. | N | Do. |
| 7 | 90 ml. 9% aqueous oxalic acid and 10 ml. 5% phosphoric acid. | N | Do. |

EXAMPLES 8 TO 12

A stock solution of oleoresin was prepared by dissolving 1860 grams of low grade oleoresin in 500 grams of petroleum ether (B. P. 35°–60° C.) and filtering. Samples of this solution, 150 ml. each, were washed by shaking in a separatory funnel with 50 ml. of mixtures of aqueous solutions of sulfuric and oxalic acid. After the acid washing was completed, the aqueous layer was separated from the oleoresin solution, and the oleoresin solution was washed with water to remove traces of the acid washing solution. The results are shown in the following table.

*Table II*

| No. | Washing solution | Rosin grade | Appearance of rosin |
|---|---|---|---|
| 8 | Distilled water | G | Clear. |
| 9 | 45 ml. 10% aqueous sulfuric acid and 5 ml. 10% aqueous oxalic acid. | K | Do. |
| 10 | 35 ml. of 10% aqueous sulfuric acid and 15 ml. 10% aqueous oxalic acid. | K+ | Do. |
| 11 | 25 ml. of 10% aqueous sulfuric acid and 25 ml. 10% aqueous oxalic acid. | K+ | Do. |
| 12 | 50 ml. of 10% aqueous oxalic acid | K+ | Cloudy. |

EXAMPLE 13

A solution of oleoresin in turpentine was filtered to remove trash and extraneous matter. A sample of this solution on distillation showed a composition of 48% turpentine, by weight, and 52% rosin with a color grade of D. A 350 gram sample of this solution was washed by thoroughly shaking with 100 ml. of a 10% solution of aqueous oxalic acid at approximately 60° C. The solutions were allowed to separate and the aqueous layer drawn off. The oleoresin solution was then washed with 100 ml. of a 5% aqueous sulfuric acid solution at approximately 60° C. The aqueous layer was drawn off and the oleoresin washed with water to remove the acid washing solutions. The washed oleoresin was distilled in the usual manner and yielded a clear rosin of color grade N.

EXAMPLE 14

In this case, Example 3 was repeated with the exception that after the oleoresin solution was washed with 10% oxalic acid solution, it was washed with 100 ml. of 3% aqueous hydrochloric acid solution. The oleoresin yielded a clear rosin of color grade N.

EXAMPLE 15

A 250 gram sample of crude gum, a sample of which on distillation yielded 20.8% of turpentine, 2.2% water and 77.0% rosin of grade D, was treated with 2.5 grams solid oxalic acid (the dihydrate) at approximately 75° C. for 20 minutes with occasional shaking. The oleoresin was dissolved in 100 grams of freshly distilled gum turpentine, and the resulting solution was washed by thorough shaking with two 100 ml. portions of aqueous sulfuric acid solution containing 10% sulfuric acid by weight. After separation of the aqueous acid solution, the oleoresin solution was washed with three 100 ml. portions of distilled water. The oleoresin was separated from the wash water and steam distilled. A clear rosin of grade N was obtained.

Having thus described my invention, I claim:

1. The method of refining crude oleoresin containing iron and other acid soluble contaminating materials, comprising mixing and washing the oleoresin with an aqueous solution of oxalic acid containing from 0.5 to 5%, by weight, of an inorganic acid, and then separating the aqueous acid solution, which will contain the contaminating materials, from the oleoresin.

2. The method of refining crude oleoresin containing iron and other acid soluble contaminating materials, comprising mixing and washing the oleoresin with an aqueous solution of oxalic acid containing from 0.5 to 5%, by weight, of sulfuric acid, and then separating the aqueous acid solution, which will contain the contaminating materials, from the oleoresin.

3. The method of refining crude oleoresin containing iron and other acid soluble contaminating materials, comprising mixing and washing the oleoresin with an aqueous solution of oxalic acid containing from 0.5 to 5%, by weight, of hydrochloric acid, and then separating the aqueous acid solution, which will contain the contaminating materials, from the oleoresin.

4. The method of refining crude oleoresin containing iron and other acid soluble contaminating materials, comprising mixing and washing the oleoresin with an aqueous solution of oxalic acid containing from 0.5 to 5%, by weight, of phosphoric acid, and then separating the aqueous acid solution, which will contain the contaminating materials, from the oleoresin.

5. The method of refining crude oleoresin containing iron and other acid soluble contaminating materials, comprising mixing and washing the oleoresin with an aqueous oxalic acid solution, then separating the solution from the oleoresin, then washing and mixing the oleoresin with an aqueous inorganic acid solution containing 0.5 to 5%, by weight, of the inorganic acid, and then separating the aqueous acid solution from the oleoresin.

6. The method of refining crude oleoresin containing iron and other acid soluble impurities, comprising treating the crude oleoresin with from 0.1 to 3% of its weight with oxalic acid dihydrate crystals, dissolving said oleoresin in from 25 to 60% of its weight of a volatile organic solvent immiscible with water, then mixing and washing the oleoresin solution with an aqueous solution of an inorganic acid containing from 0.5 to 5%, by weight, of the inorganic acid, and then separating the oleoresin solution from the aqueous acid solution.

7. The method of refining crude oleoresin containing iron and other acid-soluble contaminating materials comprising mixing and washing the oleoresin with an aqueous solution of oxalic acid and an aqueous solution of 0.5 to 5.0% by weight of an inorganic acid, and then separating the aqueous acid solution from the oleoresin.

RAY V. LAWRENCE.